(12) United States Patent
Cordaro

(10) Patent No.: US 8,465,715 B1
(45) Date of Patent: Jun. 18, 2013

(54) METHOD FOR SYNTHESIZING METAL BIS(BORANO) HYPOPHOSPHITE COMPLEXES

(75) Inventor: Joseph G. Cordaro, Oakland, CA (US)

(73) Assignee: Sandia Corporation, Albuquerque, NM (US)

( * ) Notice: Subject to any disclaimer, the term of this patent is extended or adjusted under 35 U.S.C. 154(b) by 472 days.

(21) Appl. No.: 12/829,592

(22) Filed: Jul. 2, 2010

Related U.S. Application Data

(60) Provisional application No. 61/228,859, filed on Jul. 27, 2009.

(51) Int. Cl.
 *C01B 6/21* (2006.01)
 *C01B 6/00* (2006.01)
 *C01B 35/026* (2006.01)

(52) U.S. Cl.
 USPC .......................................... 423/287; 423/294

(58) Field of Classification Search
 None
 See application file for complete search history.

(56) References Cited

U.S. PATENT DOCUMENTS

| | | | |
|---|---|---|---|
| 6,586,563 B1 | 7/2003 | Ortega |
| 6,670,444 B2 | 12/2003 | Amendola |
| 7,019,105 B2 | 3/2006 | Amendola |
| 7,214,439 B2 | 5/2007 | Ortega |
| 2006/0102489 A1 | 5/2006 | Kelly |
| 2008/0172932 A1 | 7/2008 | Kelly |

OTHER PUBLICATIONS

E. Lee Gamble; Paul Giirnont; "Preparation and Properties of Diborane Diphosphine", The Research Laboratory of Inorganic Chemistry, Massachusetts Institue of Technology, Apr. 1940, 77. pp. 717-721.
John W. Gilje, Karen W. Morse; R. W. Parry; "The Preparation ands Structure of Ammonia and Alkylamine Addition Compounds of Phsphine Diborane, B2H6 PH2 NR3", Inorganic Chemist Oct. 1967, vol. 6(10), pp. 1761-1765.
T. Imamoto; "Synthesis and reactions of new phosphine-boranes", Pure & ized Chemistry, 1993, vol. 65(4), pp. 655-660.
E. Mayer; A. W. Laubengayer; "Reaktion von Phosphinboran, Phenylphosphinboran und Phosphoniumjodid mit Natriumtetrahydridborat", Monatshefte fur Chemie, 1970, 101, pp. 1138-1144.
Jamed McNulty, Yuehui Zhou; "A highly efficient general synthesis of phosphine-borane complexes", Tetrahedron Letters, 2004, 45, pp. 407-409.
R. W. Rudolph; R. W. Parry; C. F. Farran; "The Structure of Phosphine Borane", Inorganic Chemistry, 1966, vol. 5(5), pp. 723-726.

*Primary Examiner* — Emily Le
*Assistant Examiner* — Jenny Wu
(74) *Attorney, Agent, or Firm* — Timothy P. Evans

(57) ABSTRACT

The present invention describes the synthesis of a family of metal bis(borano) hypophosphite complexes. One procedure described in detail is the syntheses of complexes beginning from phosphorus trichloride and sodium borohydride. Temperature, solvent, concentration, and atmosphere are all critical to ensure product formation. In the case of sodium bis (borano) hypophosphite, hydrogen gas was evolved upon heating at temperatures above 150° C. Included in this family of materials are the salts of the alkali metals Li, Na and K, and those of the alkaline earth metals Mg and Ca. Hydrogen storage materials are possible. In particular the lithium salt, $Li[PH_2(BH_3)_2]$, theoretically would contain nearly 12 wt % hydrogen. Analytical data for product characterization and thermal properties are given.

11 Claims, 3 Drawing Sheets

METHOD FOR SYNTHESIZING METAL BIS(BORANO) HYPOPHOSPHITE COMPLEXES

CROSS-REFERENCE TO RELATED APPLICATIONS

This application claims priority to prior U.S. Provisional Patent Application Ser. No. 61/228,859 originally filed Jul. 27, 2009 and entitled "Synthesis of Metal Phosphino-Boranes as Hydrogen Storage Materials" from which benefit is claimed.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

BACKGROUND

Field of the Invention

The present invention relates generally to metal phosphine-borane compounds, their synthesis and their use as hydrogen storage materials. More particularly, the invention relates to the synthesis of $Na[PH_2(BH_3)_2]$.

As the cost of energy continues to soar, increasing interest is directed toward the development of new sources of fuels. The continuing and ever increasing consumption of fossil resources is of particular concern due both to the consequences of increased global demand for dwindling reserves of easily obtained petroleum oil and the continuing and growing threat of global warming. In particular, the amount of petroleum oil refined and burned as gasoline in order to fuel automobiles in this country and the amount of natural gas, coal and petroleum fuel for central electric power-generating stations continues to increase with no end in sight. An alternative fuel for either or both of these applications is especially desired in view of the amounts of resources consumed and the amount of greenhouse gases generated annually as a result of converting these fuels into energy through combustion.

One possible and very attractive alternative fuel is hydrogen since it produces only water vapor as a byproduct when burned. However, storage of hydrogen for automotive applications is problematic. Storage of hydrogen as a metal hydride has been extensively investigated for at least the last 40 years. Unfortunately, because of thermodynamic and kinetic constraints, the essential properties needed for a hydride storage material (high hydrogen capacity, low reaction enthalpy, reversibility and low desorption temperature) are very difficult to satisfy simultaneously.

Several simple borohydride compounds, particularly calcium borohydride and magnesium borohydride, are being investigated for their utility to reversibly store and release hydrogen on demand. Unfortunately, both of these materials decompose to form the thermodynamically stable anion $[B_{12}H_{12}]$, limiting any hope for a reversible system. Furthermore, thermal decomposition of these borohydrides requires temperatures in excess of 300° C. Preparation of the calcium and magnesium borohydrides is difficult. Several of the accepted prior art methods include using diborane ($B_2H_6$) gas (see U.S. Pat. Nos. 2,545,633 and 3,224,832), a potentially dangerous material due to its ability to spontaneously ignite in moist air, and as a causative agent for respiratory distress.

Materials that can release hydrogen gas upon heating are desirable for numerous transportation and military applications in addition to stationary power supplies. These materials are unique because they offer a potentially high density means of storing hydrogen gas. This disclosure discusses the synthesis of a new family of materials which contain a P—B bond. Hydrogen atoms account for the remaining unbound valence electrons at phosphorus and boron sites. In most cases, the materials are negatively charged with an alkali or alkaline earth cation (Li, Na, K, Mg, Ca, etc.). This class of materials was first reported in the mid-20th century. The synthesis is difficult and the hydrogen storage properties have not been widely explored. Meyer and Laubenga, (Mayer, E. and Laubenga, A. W., "Reaktion von Phosphinboran, Phenylphosphinboran and Phosphoniumjodid mit Natriumtetrahydridoborat" *Monatshefte für Chemie*, 1970, v. 101: 1138-1144) reported the synthesis of $Na[PH_2(BH_3)_2]$ from the two different routes:

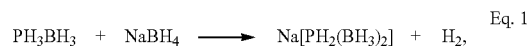

Eq. 1 and

Eq. 2 which could theoretically contain ~9.6% hydrogen by weight. The synthesis reported by Mayer et al., relies on $PH_3BH_3$ which dissociates to phosphine ($PH_3$) and a half mole of $B_2H_6$ above temperatures of about −20° C. making this reaction impractical for common laboratory syntheses. Moreover, The alternative route for synthesizing $Na[PH_2(BH_3)_2]$ utilizing $NaBH_4$ and $PH_4I$ as starting materials is also impractical as the latter is no longer commercially available likely due to its high vapor pressure at room temperature and its relative instability.

Other similar salts are known but the hydrogen storage properties have not been assessed (Rudolph, R. W., Parry, R. W. and Farran, C. F., "The structure of Phosphine Borane," *Inorganic Chemistry*, 1966, v. 5(5): pp. 723-726). The lithium salt, $Li[PH_2(BH_3)_2]$, which has not been reported, would contain nearly 12 wt % hydrogen.

SUMMARY

In an embodiment of the present invention, a method is provided for preparing an alkali metal salts of the bis(borano) hypophosphite anion $[PH_2(BH_3)_2]$ by direct synthesis of an alkali or alkaline earth metal borohydride and phosphorous trichloride.

In accordance with another embodiment of the invention, a method is provided for producing a quantity of hydrogen gas through the decomposition of alkali or alkaline earth metal bis(borano) hypophosphite compounds.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent to those skilled in the art from the following detailed description when considered in conjunction with the appended drawings

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one, or more preferred embodiments of the invention and are not to be construed as limiting the invention. In the drawings.

DETAILED DESCRIPTION OF AN EMBODIMENT

In this disclosure, we describe an alternative route for synthesizing the sodium and lithium salts of the bis(borano) hypophosphite anion $[PH_2(BH_3)_2]$. The stoichiometric reactions are shown below in Eqs. 5-8.

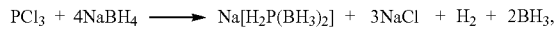

Eq. 5

$PCl_3 + 4NaBH_4 \longrightarrow Na[H_2P(BH_3)_2] + 3NaCl + H_2 + 2BH_3$, and

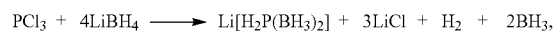

Eq. 6

$PCl_3 + 4LiBH_4 \longrightarrow Li[H_2P(BH_3)_2] + 3LiCl + H_2 + 2BH_3$,

A 500-mL three-neck, round-bottomed flask with a stir-bar was charged with 6 grams of sodium borohydride ($NaBH_4$) in 200 ml of a first solvent such as dry 1,2-dimethoxyethane (DME) in a glove box filled with an inert gas such as argon, dry nitrogen, helium or the like. The flask was closed, removed from the glove box, and attached to a Schlenk line. The resultant suspension was then cooled with a bath of dry ice and isopropyl alcohol (IPA). A second flask was prepared with a 100 mL of dry DME and 5.45 grams of phosphorous trichloride ($PCl_3$) and similarly cooled as the first flask. The $PCl_3$ solution was then added under an inert gas such as argon, dry nitrogen, helium or the like via cannula to the cold suspension of $NaBH_4$. The reaction solution was allowed to mix vigorously while warming to room temperature over several hours. After mixing for an additional 40 hours at room temperature the contents of the flask were poured into a third round bottomed flask. Most of the volatile materials were removed under reduced pressure using a rotary evaporator, leaving a white solid although some of the DME solvent would usually remain. The solid was further processed in air by adding 200 mL of a second solvent such as diethyl ether to the flask and the suspension mixed. The suspension was then filtered through a pad of diatomaceous earth on a fitted glass frit. The white solid and filter pad were again washed a second and third time with an additional quantity of 100 mL of diethyl ether with each wash. At each wash the liquid ether was collected and then concentrated under reduced pressure to provide a colorless oil comprising diethyl ether with some remaining DME. Excess residual solvent was removed under high vacuum at 60° C. to give a white solid. This procedure yielded 2.51 grams, or 75.5% based on the starting quantity of $PCl_3$. The reproducibility of the yields of this process ranged between 50% and 80%.

Figure 1:
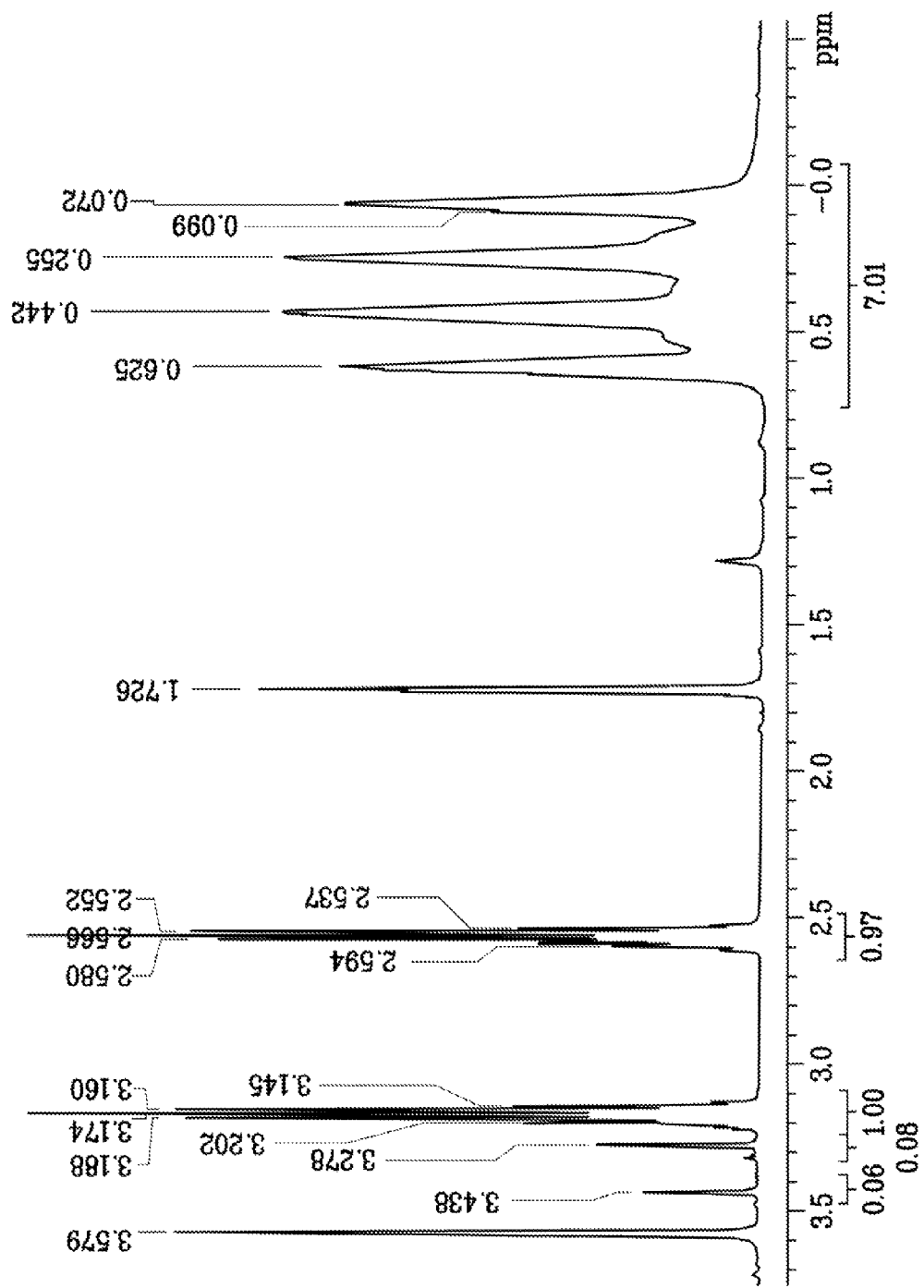
FIG. 1 illustrates a $^1$H NMR spectrum of our material dissolved in deuterated tetrahydrofuran (THF) to confirm the identity of the material.
Figure 2:
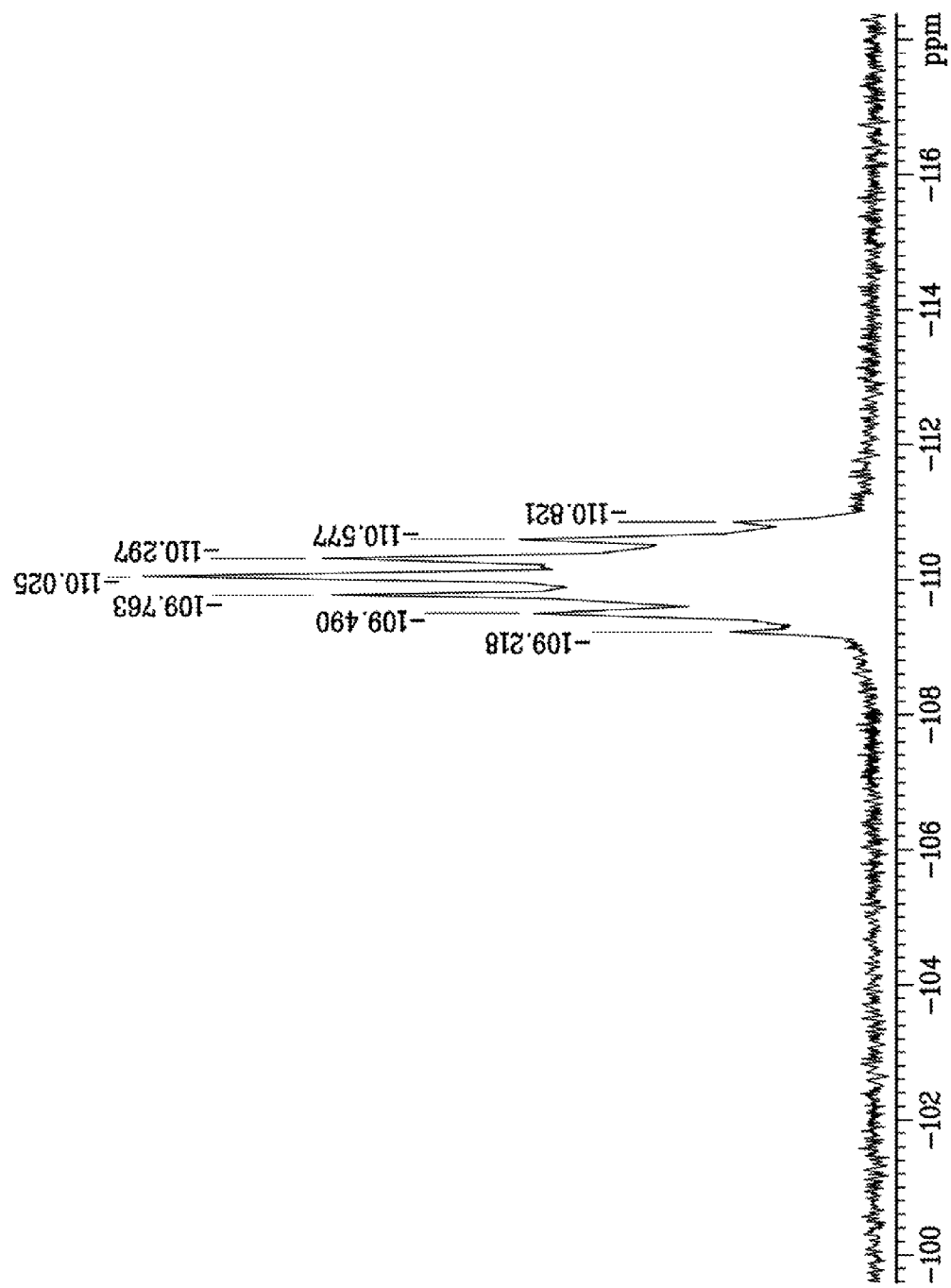
FIG. 2 shows a $^{31}$P NMR spectrum of our material dissolved in deuterated tetrahydrofuran (THF) to confirm the identity of the material.

$^1$H and $^{31}$P NMR spectroscopy was used to confirm the identity of our material. The data was collected in deuterated tetrahydrofuran (THF). The individual spectra are shown in FIGS. 1 and 2, respectively and the data compares well with the literature data published by Rudolph, Parry, and Farran in 1966 (Rudolph, R. W., Parry, R. W. and Farran, C. F., "The structure of Phosphine Borane," *Inorganic Chemistry*, 1966, v. 5(5): pp. 723-726).

Lithium salts can be prepared in a similar manner using lithium borohydride in THF instead of DME. Yields typically ranged from 50%-70%. Other salts could potentially be made using the corresponding borohydride precursor or via salt metathesis, also suggested by Mayer and Laubenga (op. cit., *Monatshefte für Chemie*, 1970), an example of which is shown below in Eq. 7, wherein the sodium cation is metathesized from another suitable metal cation:

Eq. 7

$Na[PH_2(BH_3)_2] + MX \longrightarrow M[PH_2(BH_3)_2] + NaX$.

Furthermore, the alkaline earth metals may also be suitable candidates for this reaction pathway as shown in Eq. 8 below:

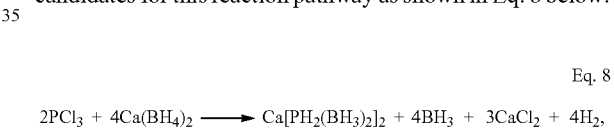

Eq. 8

$2PCl_3 + 4Ca(BH_4)_2 \longrightarrow Ca[PH_2(BH_3)_2]_2 + 4BH_3 + 3CaCl_2 + 4H_2$, Thermal decomposition of the sodium salt shows a mass loss occurring above 150° C. of 3 wt %-6 wt %. Analysis of the gas phase species evolved from this process detected $H_2$, $PH_3$ and $B_2H_6$. An exact yield for the gaseous species could not be determined.

Figure 3:
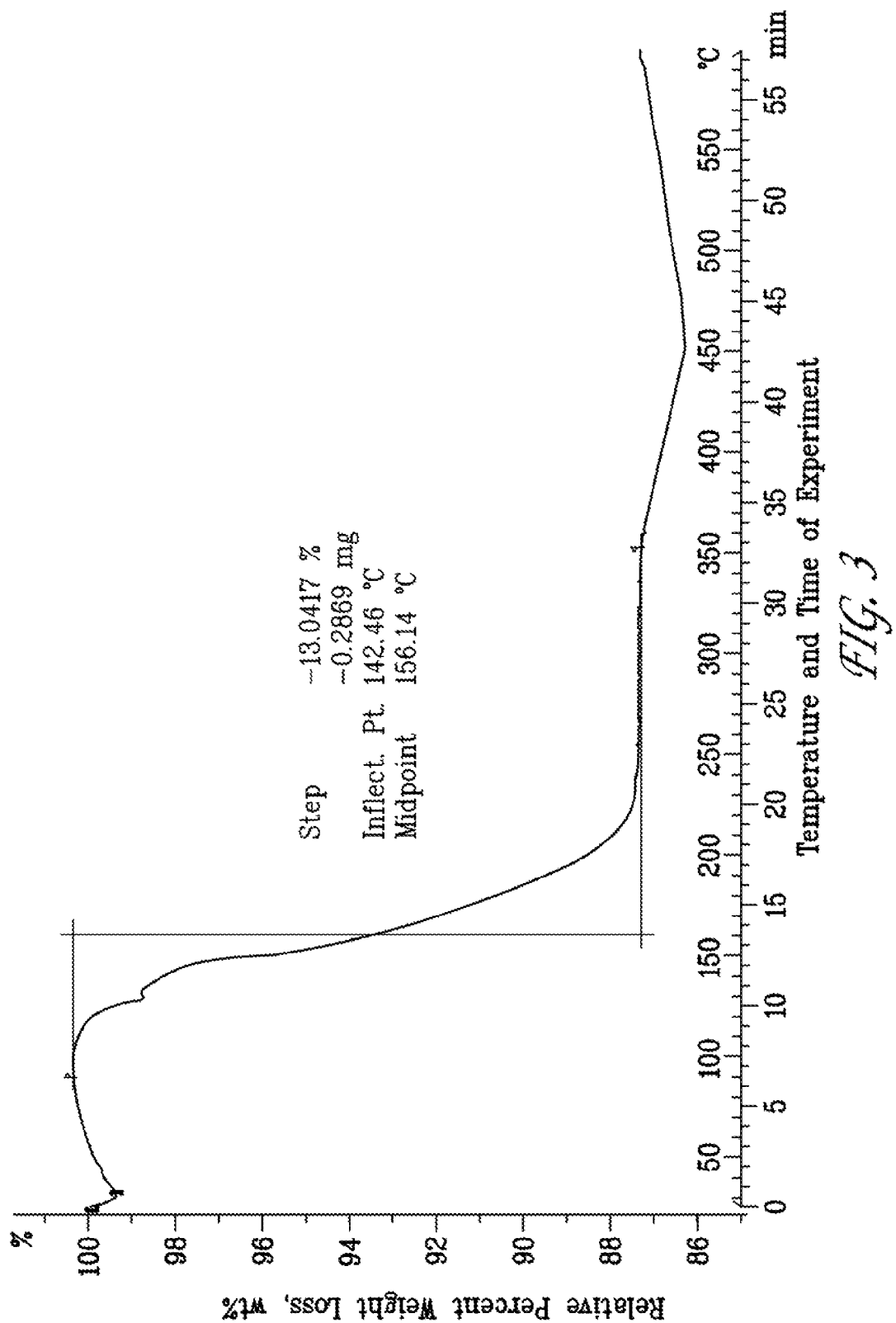
FIG. 3 shows the mass loss during thermal decomposition for a 1:1 molar mixture of $Na[PH_2(BH_3)_2]+LiAlH_4$.

Additives such as sodium alanate ($NaAlH_4$), lithium alanate ($LiAlH_4$), sodium amide ($NaNH_2$), and potassium hydride (KH) all significantly change the decomposition properties of $Na[PH_2(BH_3)_2]$. For example, when a 1:1 molar mixture of $Na[PH_2(BH_3)_2]$ and $LiAlH_4$ was heated, a mass loss of >12 wt % was measured. FIG. 3 shows the thermal decomposition trace for this particular reaction.

Therefore, a new route for synthesizing the salts $M[PH_2(BH_3)_2]$, where M=Na, Li, Mg, Ca, etc., has been described and where the hydrogen storage potential of these materials has been demonstrated. To the extent necessary to understand or complete the disclosure of the present embodiment of the invention, all publications, patents, and patent applications mentioned herein are expressly incorporated by reference therein to the same extent as though each were individually so incorporated.

Having thus described exemplary embodiments of the present invention, it should be noted by those skilled in the art that the disclosures herein are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A method for synthesizing a metal bis(borano) hypophosphite complex $(M[PH_2(BH_3)_2]_x)$, comprising the steps of:
    preparing a first suspension solution of an alkali or alkaline earth metal borohydride compound with a first quantity of a first dry solvent within a first closed container;
    preparing a second suspension solution of phosphorous trichloride with a second quantity of the first dry solvent within a second closed container;
    cooling the first and second closed containers and their contents to a temperature below 0° C.;
    adding the second suspension solution to the first suspension solution contained within the first closed container to provide a reaction solution;
    mixing the cold reaction solution at ambient temperature conditions and allowing the reaction solution to warm to room temperature;
    removing all or most of the first dry solvent from the first closed container to provide a solid residue;
    adding a quantity of a second solvent to the solid residue to form a third suspension solution;
    filtering the third suspension solution through a quantity of diatomaceous earth to provide a first filtrate liquid and a quantity of solid material deposited on the quantity of diatomaceous earth;
    collecting the first filtrate liquid; and
    removing the second solvent and any remaining first solvent from the first filtrate liquid under vacuum to provide white solid material comprising $M[PH_2(BH_3)_2]_x$, where M is an alkali or alkaline earth metal and where x=1 or 2 based upon the valence of M.

2. The method of claim 1, wherein the alkali or alkaline earth metal is Li, Na, K, Mg, or Ca.

3. The method of claim 1, wherein the first and second closed containers comprise an inert atmosphere.

4. The method of claim 1, wherein the phosphorous trichloride is present in an amount less than that which would be required to completely consume the borohydride compound.

5. The method of claim 1, wherein the step of removing the second solvent and any remaining first solvent further comprising heating the first filtrate liquid to 60° C. under vacuum.

6. The method of claim 1, wherein the step of filtering the third suspension solution further comprises washing the quantity of solid material deposited on the quantity of diatomaceous earth a second and a third time with a quantity of the second solvent to provide a second and third filtrate liquid.

7. The method of claim 6, wherein the second and third filtrate liquids are collected after each wash and added to the first filtrate liquid.

8. The method of claim 7, wherein the step of removing the second solvent and any remaining first solvent further comprises heating the first, second and third filtrate liquids to 60° C. under vacuum.

9. The method of claim 1, wherein the step of cooling comprises cooling the first and second closed containers and their contents to a temperature of about −78° C.

10. The method of claim 1, wherein the first solvent is 1,2-dimethoxyethane.

11. The method of claim 1, wherein the second solvent is diethyl ether.

* * * * *